(12) United States Patent
Wojak (10) Patent No.: US 9,173,068 B2
(45) Date of Patent: Oct. 27, 2015

(54) METHOD FOR OPERATING A MOBILE RADIO APPARATUS, MOBILE RADIO APPARATUS AS WELL AS METHOD FOR AUTOMATICALLY TRANSMITTING A MESSAGE

(71) Applicant: Ernst Wojak, Munich (DE)

(72) Inventor: Ernst Wojak, Munich (DE)

( * ) Notice: Subject to any disclaimer, the term of this patent is extended or adjusted under 35 U.S.C. 154(b) by 30 days.

(21) Appl. No.: 13/656,272

(22) Filed: Oct. 19, 2012

(65) Prior Publication Data

US 2014/0011488 A1    Jan. 9, 2014

(30) Foreign Application Priority Data

Jul. 5, 2012    (DE) .......................... 10 2012 106 044
Jul. 5, 2012    (EP) ...................................... 12175167

(51) Int. Cl.
*H04W 4/02* (2009.01)
*H04W 4/00* (2009.01)
*H04W 4/04* (2009.01)

(52) U.S. Cl.
CPC ..................................... *H04W 4/043* (2013.01)

(58) Field of Classification Search
CPC ................................. H04W 4/02; H04W 4/00
USPC .............................................. 455/418, 456.1
See application file for complete search history.

(56) References Cited

U.S. PATENT DOCUMENTS

| | | | |
|---|---|---|---|
| 6,233,452 B1 | 5/2001 | Nishino | |
| 7,069,018 B1 * | 6/2006 | Granstam et al. | .......... 455/456.1 |
| 7,248,852 B2 | 7/2007 | Cabrera et al. | |
| 2006/0099931 A1 | 5/2006 | Trujillo | |
| 2009/0109941 A1 * | 4/2009 | Carter | ........................... 370/338 |
| 2009/0197620 A1 | 8/2009 | Choi et al. | |
| 2010/0120450 A1 | 5/2010 | Herz | |
| 2010/0199188 A1 * | 8/2010 | Abu-Hakima et al. | ........ 715/733 |
| 2011/0182250 A1 * | 7/2011 | Shin et al. | ..................... 370/329 |
| 2011/0238824 A1 * | 9/2011 | Scott et al. | .................... 709/224 |
| 2012/0023152 A1 * | 1/2012 | Felt et al. | ....................... 709/203 |
| 2012/0170521 A1 * | 7/2012 | Vogedes et al. | ............... 370/329 |
| 2012/0209826 A1 * | 8/2012 | Belimpasakis | ............... 707/710 |
| 2012/0296686 A1 * | 11/2012 | Fugman et al. | .............. 705/7.19 |
| 2013/0023282 A1 * | 1/2013 | Lin et al. | .................... 455/456.1 |

(Continued)

FOREIGN PATENT DOCUMENTS

| | | |
|---|---|---|
| CA | 2444810 A1 | 1/2003 |
| DE | 69826932 T2 | 2/2006 |

(Continued)

*Primary Examiner* — Jinsong Hu
*Assistant Examiner* — Jean Chang
(74) *Attorney, Agent, or Firm* — Fitch, Even, Tabin & Flannery LLP (57) ABSTRACT

The invention relates to a method for operating a mobile radio apparatus (10) connectable to at least one radio network (14) via radio technology, having at least one display (22) and at least one computing device for executing at least one computer program (24) for presenting content provided in a computer network and retrievable via the radio network (14) on the display (22), in which the mobile radio apparatus (10) is connected to the radio network (14) via radio technology, wherein the computer program (24) is opened depending on a connection state of the mobile radio apparatus (10) to the radio network (14) and at least a part of the content is displayed on the display (22) by means of the opened computer program (24), to a mobile radio apparatus (10) as well as to a method for automatically transmitting a message to a mobile radio apparatus (10).

14 Claims, 2 Drawing Sheets

(56) References Cited

U.S. PATENT DOCUMENTS

2013/0203445 A1* 8/2013 Grainger et al. ........... 455/456.3
2013/0231135 A1* 9/2013 Garskof .................... 455/456.1
2013/0257583 A1* 10/2013 Sinha ............................ 340/3.1

FOREIGN PATENT DOCUMENTS

| WO | 03007553 A1 | 1/2003 |
|---|---|---|
| WO | 2009120466 A2 | 10/2009 |

* cited by examiner

METHOD FOR OPERATING A MOBILE RADIO APPARATUS, MOBILE RADIO APPARATUS AS WELL AS METHOD FOR AUTOMATICALLY TRANSMITTING A MESSAGE

CROSS-REFERENCE TO RELATED APPLICATION

This application claims foreign priority under 35 U.S.C. §119 to European Patent Application No. 12 175 167.1, filed Jul. 5, 2012, as well as German Patent Application 10 2012 106 044.4, also filed Jul. 5, 2012, both of which are hereby incorporated herein by reference.

The present invention relates to a method for operating a mobile radio apparatus according to the preamble of claim 1, a mobile radio apparatus according to the preamble of claim 10 as well as a method for automatically transmitting a message to a mobile radio apparatus.

Such a method as well as such a mobile radio apparatus are sufficiently known from the general prior art. The mobile radio apparatus includes a radio technology device, by means of which the mobile radio apparatus can be connected to at least one radio network via radio technology, i.e. in wireless manner. The radio network is for example a wireless local area network, which usually is also referred to as WLAN (Wireless Local Area Network).

The mobile radio apparatus is for example a cell phone, which usually is also referred to as a cellular phone or Smartphone. The mobile radio apparatus can also be a so-called tablet PC or another computer equipped with a radio technology device for connecting the mobile radio apparatus to the radio network. The mobile radio apparatus has at least one display as well as a computing device. The computing device serves for executing at least one computer program, by means of which content provided in a computer network and retrievable via the radio network can be presented on the display.

Within the scope of the method for operating the mobile radio apparatus, the mobile radio apparatus is connected to the radio network via radio technology such that the mobile radio apparatus can exchange data with the radio network.

Such a mobile radio apparatus can for example be taken as known from DE 698 26 932 T1. There, the computer program is a so-called browser, which usually is also referred to as a web browser. Such a web browser serves for so-called surfing the Internet and in particular the World Wide Web (WWW). The content provided in the Internet or in the World Wide Web is so-called Internet sites or web pages.

In order to be able to surf the Internet or the World Wide Web, the browser has to be executed by the computing device and opened. Therein, the execution and/or the opening are effected by a user of the mobile radio apparatus. To this, the user operates a corresponding control element of the mobile radio apparatus. The control element can be a knob. Alternatively, it can be provided that the display is a touch-sensitive display, i.e. a so-called touch screen, via which various functionalities and thus also the opening and/or the starting of the browser can be effected.

From CA 2 444 810 A1, from WO 03/007553 A1 and from U.S. Pat. No. 248,852 B2 too, a mobile radio apparatus in the form of a PDA (Personal Digital Assistant) is known, on the control device of which a local browser is executable. The browser can obtain general information about services from a server via the Internet. The general information in turn contains information about applications such as for example graphical information with display symbols, which can be displayed on the display of the mobile radio apparatus. After the browser has obtained the general information of the available services and the applications corresponding thereto, the display symbols are displayed on the display and a user of the mobile radio apparatus can start a corresponding one of the applications and the service corresponding thereto by a single click. By starting the service or the application, the browser of the mobile radio apparatus downloads further parts of the application.

In other words, this means that the user of a mobile radio apparatus always has to actively take action and to actively start or open the computer program for presenting the content provided in the computer network and retrievable via the radio network on the display by actively starting a corresponding function of the mobile radio apparatus.

This results in an expensive and laborious operation of the mobile radio apparatus, in particular if the user of the mobile radio apparatus has to perform further inputs into the mobile radio apparatus in order to actually cause the content to be displayed on the display via the computer program. These specifications can for example be a so-called log-in process, within the scope of which the user has to input for example personal information as well as passwords difficult to remember.

Therefore, it is the object of the present invention to further develop a method for operating a mobile radio apparatus as well as a mobile radio apparatus of the initially mentioned type such that particularly simple operation of the mobile radio apparatus as well as provision of the user with information simple for the user is allowed.

This object is solved by a method having the features of claim 1, by a mobile radio apparatus having the features of claim 10 as well as by a method having the features of claim 11. Advantageous configurations with convenient and non-trivial developments of the invention are specified in the remaining claims.

The first aspect of the invention relates to a method for operating a mobile radio apparatus connectable to at least one radio network via radio technology, which has at least one display and at least one computing device for executing at least one computer program, by means of which content provided in a computer network and retrievable via the radio network can be presented on the display. In the method, the mobile radio apparatus is connected to the radio network via radio technology.

For realizing a particularly simple operation of the mobile radio apparatus, according to the invention, it is provided that the computer program is opened depending on a connection state of the mobile radio apparatus to the radio network and at least a part of the content is displayed on the display by means of the opened computer program. Thus, a person using the mobile radio apparatus, which is also referred to as a user, does not have to actively take action to effect opening and optionally starting the computer program by the computing device as well as presentation of the content on the display. The presentation of the content is rather automatically effected. Thereby, time-consuming inputs of personal data and/or of passwords into the mobile radio apparatus by the user can also be avoided.

Preferably, the connection of the mobile radio apparatus to the radio network is already automatically effected, i.e. without active assistance by the user. For example, this can be the case if the mobile radio apparatus previously was already at least once connected to the radio network. Within the scope of this first-time connection of the mobile radio apparatus to the radio network, the user of the mobile radio apparatus for example inputs personal data, for example his email address and/or at least one keyword, into the mobile radio apparatus via appropriate input means such that the mobile radio apparatus is authorized to connect to the radio network. Subsequent to this first-time input of data, then, further connections of the mobile radio apparatus to the radio network following a corresponding interruption of the connection, can occur without the user having again to perform data inputs on the mobile radio apparatus.

Within the scope of the first-time connection, for example, the so-called MAC address (Media Access Control Address) of the mobile radio apparatus is also communicated to the radio network such that the mobile radio apparatus is uniquely identified upon the subsequent connections and subsequently can be authorized to new connections to the radio network performed by the computing device. This MAC address is a hardware address of a radio technology device, in particular a network adapter, of the mobile radio apparatus, via which the mobile radio apparatus can be connected to the radio network via radio technology. Usually, the MAC address is also referred to as Ethernet ID, WiFi address or physical address.

From this, it is apparent that data input or output by the user can be effected only once in order to connect the mobile radio apparatus to the radio network for the first time. Subsequent to this, further connections of the mobile radio apparatus to the radio network following interruptions of the connections can be automatically performed by the computing device without active assistance by the user being required.

In advantageous development of the invention, the mobile radio apparatus is connected to at least one network apparatus of the radio network via radio technology, wherein the connection state is determined depending on a signal strength of a signal communicated from the network apparatus to the mobile radio apparatus. Alternatively or additionally, it can be provided that the connection state is determined depending on a position of the mobile radio apparatus relative to the network apparatus determined by means of the network apparatus.

Alternatively or additionally, it can further be provided that the connection state is determined depending on a number of network apparatuses of the radio network, to which the mobile radio apparatus is connected via radio technology. In other words, the connection state can also be characterized by the number of the network apparatuses being able to transmit signals to the mobile radio apparatus and/or receive signals from the mobile radio apparatus.

In other words, the automatic opening of the computer program and presenting the content effected by the computing device is effected depending on the signal strength and/or on the position of the mobile radio apparatus relative to the network apparatus and/or on the number of network apparatuses. Thereby, it can for example be avoided that the computer program is opened if the user with the mobile radio apparatus only moves past the network apparatus or the radio network in relatively far distance to the network apparatus and thus to the radio network, and for example does not intend to enter an institution corresponding to the radio network such as for example a construction, a building, a shopping store and/or the like and/or to get information about the institution from outside of the institution. Herein, only a relatively low signal strength and a relatively large distance between the network apparatus and the mobile radio apparatus occur such that the computer program is not opened.

However, if the user enters the institution and/or the user stays in front of the institution, for example in order to have a look at the institution and/or to get information about the institution, thus, for example in order to have a look at shop windows of the shopping store, thus, the signal strength is relatively high and/or the distance between the mobile radio apparatus and the network apparatus is relatively low, such that consequently the computer program is automatically opened and at least the part of the content is displayed by means of the opened computer program.

Thereby, adequate display of the part of the content is allowed. Moreover, the user can be provided with information about the institution, in and/or at which he stays, by means of the content in specific and adequate manner. To this, the user does not have to actively take action, but passively obtains the information about the institution presented by the part of the content.

The mobile radio apparatus can be a cell phone, which usually is also referred to as a cellular phone or as a Smartphone. The mobile radio apparatus can also be a so-called tablet PC or a PDA (Personal Digital Assistant). It is also possible that the mobile radio apparatus is a PC (Personal Computer), which includes a radio technology device, by means of which the PC can be connected to the radio network via radio technology. The connection to the radio network via radio technology is usually also referred to as wireless connection, since a line or wire, via which the mobile radio apparatus is connected to the network apparatus, is not provided between the mobile radio apparatus and for example the network apparatus, via which the mobile radio apparatus is connected to the radio network. Rather, the mobile radio apparatus is connected to the network apparatus and thus the radio network via exchange of electromagnetic waves.

For example, the signal strength is determined by the computing device of the mobile radio apparatus. If a value characterizing the signal strength reaches or exceeds a presettable threshold value, thus, the computer program is opened by means of the computing device and optionally previously started and the part of the content is displayed by means of the opened computer program. If the mobile radio apparatus is not connected to the radio network or the mobile radio apparatus is connected to the radio network, but the value characterizing the signal strength remains below the presettable threshold value, thus, the computer program is not automatically opened and the part of the content is not presented.

Therein, by opening the computer program, it is understood that the computer program is already executed by the computing device, but not displayed on the display or does or cannot display the content, since a user interface of the computer program is not presented on the display. Usually, this is designated such that the computer program is executed in the background.

In this case, the computer program is not first started, but it is opened such that at least in a partial region of the display the part of the content is presented on the display. If the computer program is not yet started, i.e. if is not yet executed by the computing device, neither in the background, thus, depending on the connection state, the computer program is automatically started and opened such that the content is displayed visible to the user at least in a partial region of the display.

The computer network is preferably the Internet and in particular the World Wide Web (WWW), wherein the part of the Internet or of the World Wide Web is Internet sites or web pages. The part of the Internet or the World Wide Web, which is displayed on the display depending on the connection state, is preferably at least one of the Internet sites or one of the web pages. On the Internet site, which is automatically presented depending on the connection state, preferably, information about the institution corresponding to the radio network, i.e. about the construction, the building, the shopping store and/or the like, is displayed. Thereby, the user of the mobile radio apparatus can be adequately and specifically provided with information about the institution.

In particular, the computer program is a so-called web browser, which is usually also referred to as a browser and by means of which Internet sites and in particular web pages of the World Wide Web can be displayed.

In a particularly advantageous embodiment of the invention, the connection state is determined depending on a period of time, over which the mobile radio apparatus is, in particular continuously, connected to the radio network via radio technology. Thereby, the opening of the computer program as well as the presentation of the part of the content can be avoided if the user with the mobile radio apparatus only moves past the institution and thus the radio network without staying a correspondingly long and presettable period of time in and/or at the institution and correspondingly being connected to the radio network.

If a value characterizing the period of time, over which the mobile radio apparatus is, in particular continuously, connected to the radio network via radio technology, reaches or exceeds a presettable threshold value, thus, the computer program is automatically opened by means of the control device and optionally previously started and the part of the content is presented on the display.

If the value characterizing the period of time remains below the threshold value, thus, the part of the content is not automatically displayed. This for example occurs if the mobile radio apparatus is connected to the radio network only for a short time and after a short period of time after connection interruption of the connection of the mobile radio apparatus to the radio network occurs since for example the user with the mobile radio apparatus moves out of the range of the network apparatus and thus of the radio network.

In a particularly advantageous embodiment of the invention, as the part of the content, an Internet site, in particular a web page of the Internet, in particular of the World Wide Web, is displayed by means of the computer program. Hereby, the user can be provided with optical and/or acoustic information about the institution corresponding to the radio network in particularly clear and descriptive manner.

In further advantageous embodiments of the invention, the mobile radio apparatus is connected to a wireless local area network as the radio network. Such a wireless local area network is usually referred to as WLAN (Wireless Local Area Network). Such a wireless local area network is associated with a presettable institution, about which the user can be provided with information in specific and adequate manner, which is provided to him by the part of the content.

The mobile radio apparatus can also be connected to a mobile communications network. Temporally before connecting the mobile radio apparatus to the wireless local area network, for example, contents of the computer network can be obtained via the mobile communications network and displayed on the display. In other words, surfing the internet—if the mobile radio apparatus is not connected to the wireless local area network—occurs via the mobile communications network, wherein it is for example an UMTS (Universal Mobile Telecommunications System), GPRS (General Packet Radio Service) or LTE (Long-Term-Evolution).

If the connection of the mobile radio apparatus to the wireless local area network is now effected, thus, switching of the mobile radio apparatus effected for example by the computing device occurs, whereby in the time, in which the mobile radio apparatus is connected to the wireless local area network, contents of the computer network are obtained via the wireless local area network and displayed on the display. In other words, surfing the Internet by means of the mobile radio apparatus—if the mobile radio apparatus is connected to the wireless local area radio network—is no longer effected via the mobile communications network, but via the separate, wireless local area network (WLAN) independent thereof.

Hereby, data volume limited by a mobile phone operator providing the mobile communications network, which is allowed to be received and/or transmitted by the mobile radio apparatus via the mobile communications network for example with a presettable transfer rate within a presettable period of time, can be saved. In other words, the limited data volume is not affected by use of the wireless local area network.

While the mobile radio apparatus is connected to the wireless local area network, however, complete disconnection from the mobile communications network is preferably not effected. A service or a protocol or the like, which is used for surfing the Internet if the mobile radio apparatus is not connected to the wireless local area network, is deactivated and/or not used. Other services, protocols or the like used for receiving and/or transmitting MMS, SMS and/or for performing telephone calls remain activated and/or can be used even if the mobile radio apparatus is connected to the wireless local area network. Thereby, for example, the possibility of sending an SMS to the user of the mobile radio apparatus and/or to call the user even if his mobile radio apparatus is connected to the wireless local area network is not affected.

It has proven particularly advantageous if a position of the mobile radio apparatus relative to or on the earth is determined by means of the radio network, wherein depending on the determined position at least one further part of the content different from the displayed part of the content is displayed. For example, if the institution, to the radio network of which the mobile radio apparatus is connected, includes several, different regions, thus, by determining the position of the mobile radio apparatus and thus of the user relative to the earth and thus relative to at least one network apparatus of the radio network, it can be determined, in which of the regions of the institution the user with the mobile radio apparatus is located.

Thus, it is possible to specifically and adequately provide the user with information about the region, in which the user is currently located, via the presented part of the content. For example, if the institution is a museum with different rooms, in which different objects are exhibited, thus, the user can be specifically provided with information about the individual rooms and optionally about the individual objects in the rooms via the part of the content.

If the institution is for example a location with a plurality of constructions, thus, the user of the mobile radio apparatus can be provided with information about that one of the constructions, in or in front of or on or under which he is currently located. Thus, it is for example possible to inform the user about different institutions of a city as the institution, through which the user moves with the mobile radio apparatus. If the user for example stays for a certain period of time in or at an institution of the city, thus, he can be provided with corresponding information about this institution of the city by the part of the content without having to actively take action and without performing expensive and laborious data inputs.

Therein, the institution or an operator of the institution provides the radio network in order that visitors or guests of his institution are able to surf the Internet. Such provision of a possibility of access to the Internet or the World Wide Web via a wireless radio network is usually referred to as a hotspot. The institution can be a public space such as a restaurant, café, hotel, hospital or a public place like an airport, railway station etc. At such a hotspot, the user can establish a connection to the Internet by means of WLAN technology.

In further advantageous development of the invention, depending on the connection state, at least one message able to be displayed on the display by means of a computer program executable by the computing device is communicated to the mobile radio apparatus. For communicating the message, the data, in particular the email address, communicated in the first-time connection of the mobile radio apparatus to the radio network can be used. Thereby, it is possible to specifically provide the user with information useful for him.

Within the scope of the first-time connection, the user can provide e.g. personal information for example about his interests, desires and/or the like such that the message communicated to him can be adapted to the information concerning its message content. Thereby, the user can be provided with personalized information, i.e. adapted to his person and/or desires and/or interest.

Alternatively or additionally, it is possible to also adapt the part of the content to the data output performed in the first-time connection such that the user can be provided with personalized and user-specific information via the part of the content. Thereby, it can for example be communicated to the user, which interests, desires and/or the like can be covered by the institution, in or at which the user is currently located.

In order to be able to provide the user with information in clear and optically attractive manner, it is preferably provided that an email is communicated as the message. However, the communication of an SMS (short message service) or an MMS (multimedia messaging service) is also possible.

In further development of the invention, it is provided that the message is communicated depending on at least one information specific to mobile radio apparatus and transmitted upon connection to the radio network.

This information specific to mobile radio apparatus can be the MAC address previously described, via which the mobile radio apparatus and via it the user can be uniquely identified. Thereby, the user can be provided with personal and individual information. Thus, it is also possible for the user in fast and simple manner to recognize if the institution corresponding to the radio network is able to cover his desires and/or interests.

The second aspect of the invention relates to a mobile radio apparatus comprising a radio technology device for connecting the mobile radio apparatus to at least one radio network via radio technology, with at least one display and with at least one computing device for executing at least one computer program, by means of which content provided in a computer network and retrievable via the radio network can be presented on the display of the mobile radio apparatus.

For realizing particularly simple operation of the mobile radio apparatus, according to the invention, it is provided that the computing device is adapted to open the computer program depending on a connection state of the mobile radio apparatus to the radio network and to display at least a part of the content on the display by means of the opened computer program. In other words, the computing device of the mobile radio apparatus according to the invention is adapted to perform the method according to the invention. Advantageous developments of the first aspect of the invention are to be regarded as advantageous developments of the second aspect of the invention and vice versa.

The mobile radio apparatus according to the invention allows automatic presentation of the part of the content on the display without the user having to take action and for example to input data. This is in particular advantageous if the radio network is associated with an institution, which the user often visits and exits again. Herein, a plurality of connection operations of the mobile radio apparatus to the radio network and disconnection operations of the mobile radio apparatus from the radio network occur. Therein, the re-connection occurring subsequent to a disconnection operation after the first-time connection of the mobile radio apparatus to the radio network can be proceed automatically and without assistance of the user.

This is also advantageous above all if the user with the mobile radio apparatus visits institutions at different locations on the earth, the radio networks of which all have the same access or connection preconditions. Then, the connections of the mobile radio apparatus to the respective radio networks can be effected at the different locations automatically and without active assistance by the user such that the user can be passively provided with information about the corresponding institution at the corresponding location on the earth. In particular, it is not required that the user has to input access data such as personal information and/or email address and/or passwords in time consuming manner into the mobile radio apparatus upon each new connection to the respective radio networks, which follows a corresponding disconnection of the connection.

The third aspect of the invention relates to a method for automatically transmitting at least one message to a mobile radio apparatus connectable to a mobile communications network and to at least one local radio network different from the mobile communications network via radio technology. Further, the mobile radio apparatus has at least one display and at least one computing device for executing at least one computer program, wherein a message communicated to the mobile radio apparatus can be presented on the display by means of the computer program.

In the method, a message being able to be displayed on the display by means of the computer program is communicated to the mobile radio apparatus connected to the local radio network depending on a connection state of the mobile radio apparatus to the local radio network. Advantageous developments of the first two aspects of the invention are to be regarded as advantageous developments of the third aspect of the invention and vice versa.

This means, that additionally or alternatively to displaying the part of the content of the computer network, the message is automatically communicated to the mobile radio apparatus, if at least one criterion characterizing the connection state, as it is for example described within the scope of the first two aspects of the invention (period of time of connection, signal strength), is met.

Herein, the above described information, in particular personal information, such as for example about his email address, his interests, desires and/or the like provided by the user within the scope of the first-time connection can be used to send him the message via his mobile radio apparatus and to automatically send him information about his current environment within the scope of the message.

In particular, it is possible to adapt the message communicated to him to the information with respect to its message content. Thereby, the user can be provided with personalized information, i.e. with information adapted to his person and/or or desires and/or interest. Thereby, the user can be provided with information, where in his environment his interests, desires, intentions and/or the like can be satisfied.

If the user with his mobile radio apparatus is for example in front of or in a shopping store, and the user has specified within the scope of the provided information that he is interested in at least one product or a product type such as for example sports articles, thus, information can be automatically communicated to him within the scope of the message, where in the retail shop the product type specified by him can be found, which products of the product type can be found at which price and optionally in which size, color variations and/or the like.

A further example is that the user with his mobile radio apparatus is located in front of or in a historical construction or museum. If the user has specified within the scope of the provided information that he is interested in a certain art style or a certain artist, thus, information can be automatically communicated to him within the scope of the message, where in the construction or in the museum art objects of this art style and/or this artist can be found. Further, he can be provided with further information about the art style or the art objet via the message automatically communicated to his mobile radio apparatus. Advantageously, the message is communicated via the local radio network. Thereby, a data volume available within a period of time, which is transmitted to and from the mobile radio apparatus via the mobile communications network, can for example be saved.

In order to be able to provide the user with information in clear and optically attractive manner, it is preferably provided that an email is communicated as the message. However, the communication of an SMS (short message service) or of an MMS (multimedia messaging service), in particular via the mobile communications network, is also possible.

The computer program for displaying the message on the display, which is also referred to as messaging program in the following, is not necessarily the computer program for presenting the content provided in the computer network. The program for displaying the message is for example a so-called email or mail program, which is adapted to display emails.

Therein, it can for example be provided that the messaging program is opened, i.e. automatically opened, depending on the connection state of the mobile radio apparatus to the local radio network. Thus, the user does not have to actively take action in order to open the messaging program. Rather, he can be at least substantially passively provided with the message and the information contained therein.

Therein, it can further be provided that depending on the connection state of the mobile radio apparatus to the local radio network, not only the messaging program is opened, but also the communicated message is displayed on the display. Thus, the user is able to fast and simply read the message without having to call the messaging program and the message.

Further advantages, features and details of the invention are apparent from the following description of a preferred embodiment as well as based on the drawing. The features and feature combinations mentioned above in the description as well as the features and feature combinations mentioned below in the description of figures and/or shown in the figures alone are usable not only in the respectively specified combination, but also in other combinations or alone without departing from the scope of the invention.

Figure 1:
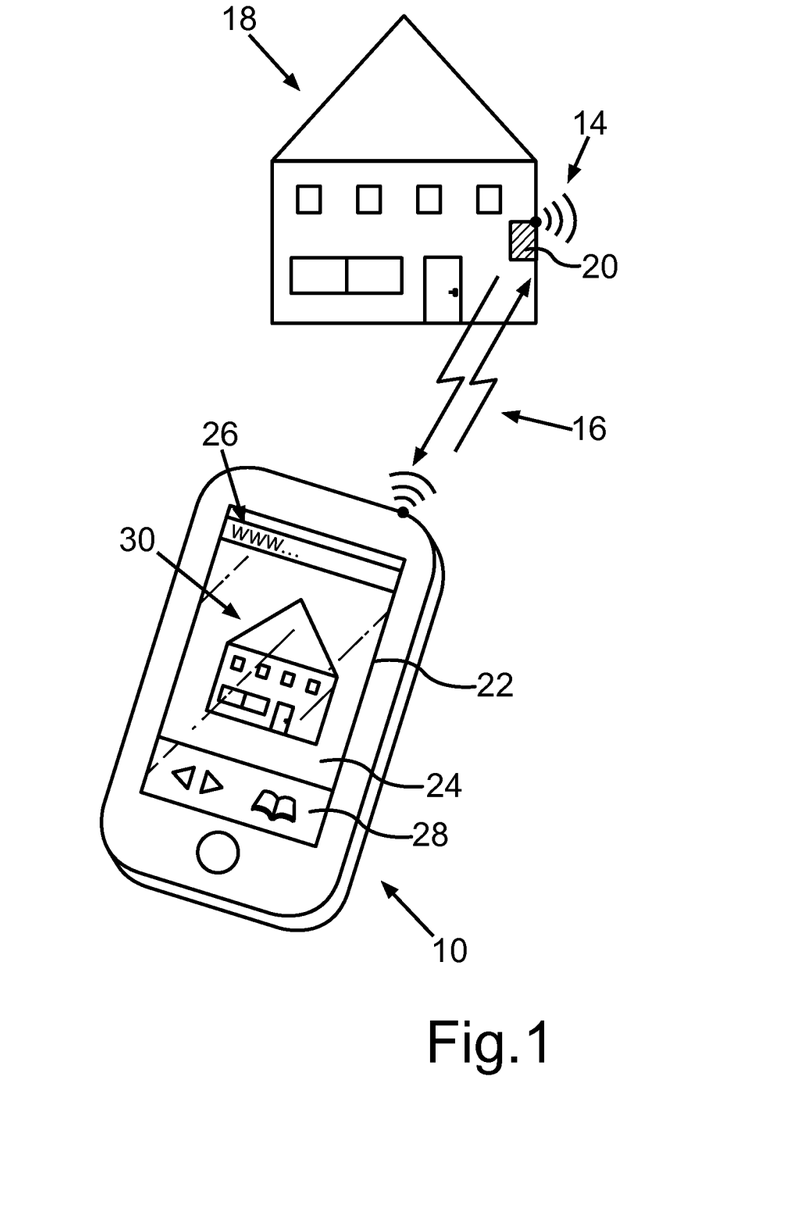
FIG. 1 a schematic perspective view of a mobile radio apparatus, which can be connected to a radio network associated with an institution illustrated in FIG. 1 via radio technology and includes at least one display as well as at least one computing device for executing at least one computer program for presenting content provided in a computer network and retrievable via the radio network on the display, wherein the computer program is opened depending on a connection state of the mobile radio apparatus to the radio network and at least a part of the content is displayed on the display by means of the opened computer program.

FIG. 1 shows a mobile radio apparatus 10, which can be connected to a mobile communications network via radio technology. A user 12 of the mobile radio apparatus 10 schematically illustrated in FIG. 2 can perform telephone calls via the mobile communications network.

The mobile radio apparatus 10 includes a radio technology device not recognizable in FIG. 1, by means of which the mobile radio apparatus 10 can be connected to a further radio network 14 independent of and different from the mobile communications network via radio technology, i.e. wirelessly via electromagnetic waves. As is illustrated by directional arrows 16, thus, data can be exchanged between the radio network 14 and the mobile radio apparatus 10.

The radio network 14 is presently a so-called wireless local area network (WLAN—Wireless Local Area Network), which is associated with an institution in the form of a building 18. The building 18 is provided with a network apparatus 20 of the radio network 14. Therein, the mobile radio apparatus 10 is connected to the network apparatus 20 and to the radio network 14 via it, respectively.

The radio network 14 is the wireless local area network since mobile radio apparatuses like the mobile radio apparatus 10 can only be connected to the radio network 14 if they are in an only relatively low distance to the building 18 and thus to the network apparatus 20. Therein, this distance in particular depends on a transmitting power of the network apparatus 20. If the mobile radio apparatus 10 is correspondingly far spaced from the network apparatus 20, thus, the mobile radio apparatus 10 cannot be connected to the radio network 14 and exchange data with the radio network 14.

The mobile radio apparatus 10 includes a computing device not recognizable in FIG. 1, by means of which various computer programs of the mobile radio apparatus 10 can be executed. The mobile radio apparatus 10 further includes a display 22, on which respective user interfaces of the programs executable by the computing device can be presented. The user 12 can interact with the computer programs and thus with the mobile radio apparatus 10 and for example input data via the respective user interfaces.

One of the computer programs executable by the computing device is a so-called web browser 24, which is also referred to as a browser. The web browser 24 serves for presenting content provided in the Internet and in particular in the World Wide Web. In other words, the user 12 can surf the Internet and in particular the World Wide Web via the web browser 24.

In FIG. 1, the web browser 24 is opened, is therefore executed by the control device and presented on the display 22. Therein, the web browser 24 includes a so-called address line 26, in which for example an Internet address beginning with "www." is entered. The web browser 24 also includes an operating bar 28 for calling different web pages. In addition, the web browser 24 includes a display region 30, in which the corresponding web pages are displayed or presented. As is apparent from FIG. 1, therein, the display region 30 only occupies a predominant partial region of the display 22, but not the entire display 22.

In order to be able to connect the mobile radio apparatus 10 to the radio network 14 of the building 18 for the first time via radio technology, a first-time input of data into the mobile radio apparatus 10 by the user 12 is required. This data is for example a password. Similarly, registration with personal data and/or with an email address of the user 12 can for example be provided in order to be able to connect the mobile radio apparatus 10 to the radio network 14 via radio technology.

This data required for the first-time connection can be stored in a storage device of the mobile radio apparatus 10 such that this data input is not only first-time but also one-time as long as deletion of the storage device or of the input data does not occur. In further connections following the first-time connection, it can be resorted to the stored data such that the connection can then be effected without active assistance by the user 12.

Alternatively, the radio network 14 can also be a so-called free radio network, wherein input or output of data such as keywords and/or the like does not have to be performed at all. Upon first-time connection to the free radio network, only a first-time and optionally one-time interaction of the user 12 with the mobile radio apparatus 10 can be effected such that the connection of the mobile radio apparatus 10 to the radio network 14 is effected for the first time.

If a disconnection of the connection follows the first-time connection, for example if the user 12 with the mobile radio apparatus 10 moves correspondingly far away from the network apparatus 20, thus, subsequent connections of the mobile radio apparatus 10 to the radio network 14, for example if the user 12 again approaches the network apparatus 20 with the mobile radio apparatus 10, can be effected automatically and without active assistance, i.e. without data input and/or data output as well as without interaction of the user 12 with the mobile radio apparatus 10.

Now, in order to allow particularly simple and comfortable operation of the mobile radio apparatus 10, the web browser 24 is opened depending on a connection state characterizing the connection of the mobile radio apparatus 10 to the radio network 14 via radio technology, and a web page schematically illustrated in FIG. 1 and corresponding to the building 18 is displayed on the display 22 by means of the opened web browser 24.

Therein, the web page is a part of content of the Internet and in particular of the World Wide Web, wherein the Internet and in particular the World Wide Web is a computer network. By this automatic opening and presenting, the user 12 is automatically and specifically provided with information about the building 18, which the user 12 can gather from the web page.

If the building 18 is for example a museum, thus, the user 12 can be provided about actual expositions and/or events in particular depending on the current time. Alternatively or additionally, it is possible to provide the user 12 with information about the building 18 itself via the web page, for example if the building 18 is a historical building. If the building 18 is a shopping store, thus, the user 12 can be informed about actual product offers.

If the first-time connection of the mobile radio apparatus 10 to the radio network 14 is effected with output or specification of personal data and/or information about the user 12, i.e. with specification or output of user-specific information, thus, the user-specific, personal information about the user 12 can be used for adapting the information to be gathered from the web page to the user-specific information.

Upon the first-time connection and/or upon corresponding registration in order to be able to connect to the radio network 14, the user 12 can for example provide information about his interests and/or desires. Depending on this information, then, corresponding information can be displayed on the web page whether these interests and/or desires can be covered by and/or in the building 18. Thereby, adequate and specific information provision to the user 12 is possible.

If the connection of the mobile radio apparatus 10 to the radio network 14 is effected depending on a signal strength of a signal communicated from the network apparatus 20 to the mobile radio apparatus 10, and/or depending on a position of the mobile radio apparatus 10 relative to the network apparatus 20 and thus relative to the building 18 determined by means of the network apparatus 20 and/or depending on a period of time, over which the mobile radio apparatus 10 is continuously connected to the radio network 14 via radio technology, thus, the automatic opening of the web browser 24 and the automatic presentation of the web page can thereby be prevented if the user 12 with the mobile radio apparatus 10 only moves past the building 18 in corresponding distance and/or only stays in front of and/or in it for a short time, but a longer dwell time is not intended.

However, if the user 12 with the mobile radio apparatus 10 is particularly long and/or particularly near in or at the building 18, thus, it can be concluded that the user 12 really desires information about the building 18 and/or about products and/or services offered there such that the user 12 can then be provided with corresponding information via the web page. Therein, the user 12 can remain passive and does not have to actively take action.

Optionally, at least one message for example in the form of an email can also be communicated to the mobile radio apparatus 10, wherein the specification or output of his email address is used. Thereby, the user 12 can be provided with further information.

If a disconnection of the connection and subsequent new connection occurs, thus, the mobile radio apparatus 10 can for example be identified via its MAC address, i.e. via a unique hardware address of its network adapter and/or via an IP number such that the user 12 can then be provided with user-specific and personal information.

The display of the web page via the web browser 24 is also advantageous in that the user 12 does not have to download and install additional apps, i.e. applications. Rather, the web browser 24 already installed on the mobile radio apparatus 10 within the scope of an operating system is used. In that the user 12 is provided with information via the radio network 14, his data volume for downloading data from the Internet via the mobile communications network either is not affected. Thereby, very high amounts of data can also be transmitted to the mobile radio apparatus 10 without affecting the data volume. Moreover, the user 12 is spared permanent new log-in. Further, he can be provided with real-time information about his environment, about contents, about offers as well as about dates, events, timetables and/or the like.

Furthermore, it is possible to determine the position of the mobile radio apparatus 10 and thus of the user 12 relative to the earth and thus relative to the building 18 by means of a positioning system, in particular by means of a satellite-assisted positioning system, such that different web pages with different information about corresponding partial regions of the building 18 can be communicated to the mobile radio apparatus 10 depending on the position of the user 12 relative to the building 18.

Alternatively or additionally, it can be provided to use the radio network 14 in order to determine the position of the mobile radio apparatus 10 and thus of the user 12 relative to the building 18, in particular within the building 18. This is exemplified based on FIG. 2.

Figure 2:
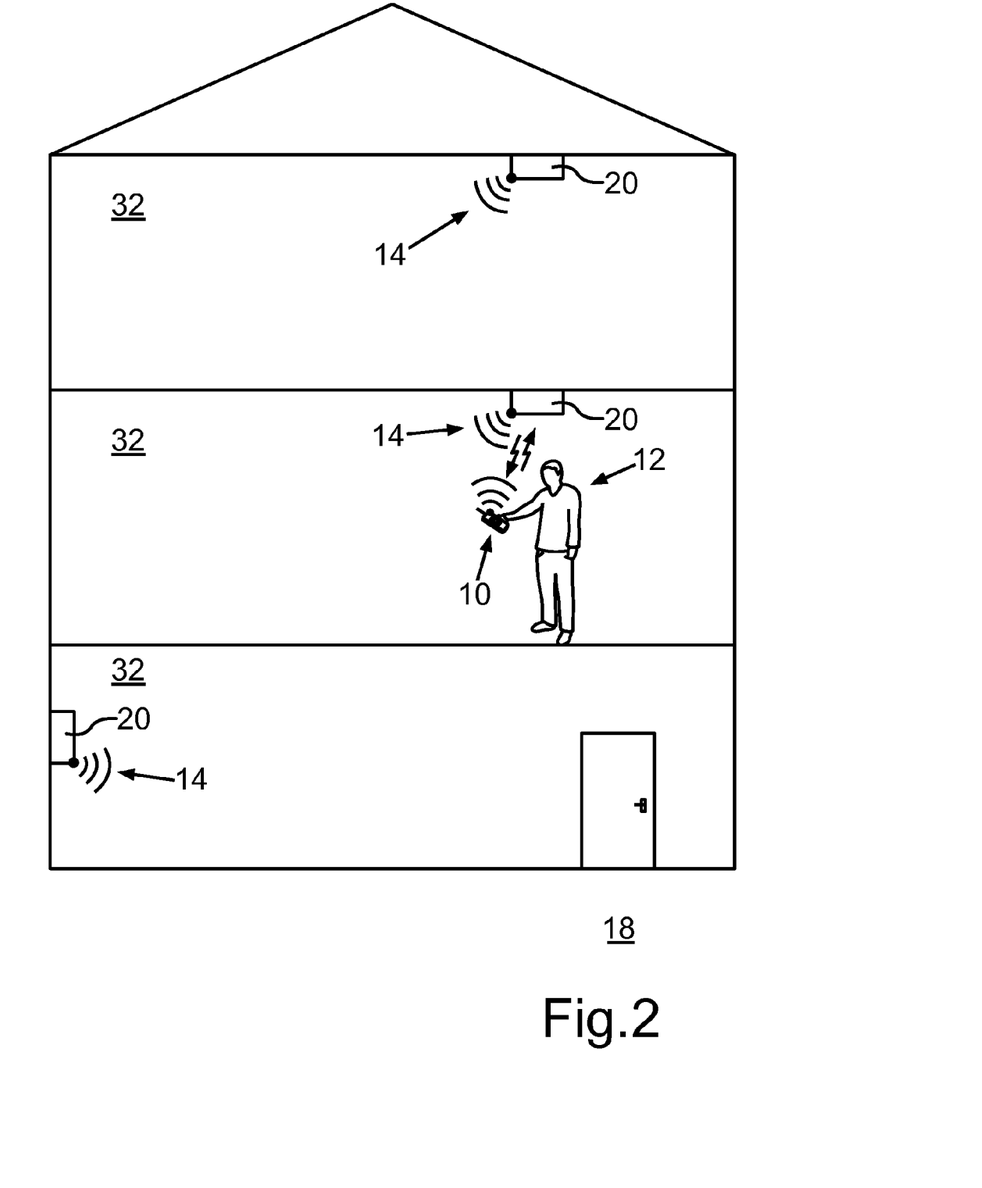
FIG. 2 a schematic view of an institution in the form of a building, with which a local radio network is associated and which has multiple rooms, wherein a user of the mobile radio apparatus according to FIG. 1 can automatically be provided with information about the individual rooms via its mobile radio apparatus and the radio network.

In different partial regions 32 of the building 18 within the same, respective network apparatuses 20 of the radio network 14 are provided. The different partial regions 32 are for example different departments and/or floors of the building 18 at least partially spatially separated from each other. Since the mobile radio apparatus 10 can be shielded from the environment of the building 18 by the building 18 such that determination of the position of the mobile radio apparatus 10 relative to the earth using a satellite-assisted positioning system is not possible, the local radio network 14 is used for positioning.

Thereby, the user 12 can be provided with information about that one of the partial regions 32, in which the user 12 with the mobile radio apparatus 10 is located. To this, a web page corresponding to that one of the partial regions 32, in which the user 12 with the mobile radio apparatus 10 is currently located, is displayed by means of the web browser 24.

If the user 12 moves with the mobile radio apparatus 10 from this partial region 32 to another one of the partial regions 32, thus, a further, different web page with information about the other partial region 32 is then displayed by means of the web browser 24.

Therein, not every one of the partial regions 32 necessarily has to be provided with a network apparatus 20. A corresponding number of network apparatuses 20, for example three network apparatuses 20, is sufficient to determine, in which one of the partial regions 32 the mobile radio apparatus 10 and thus the user 12 are located and to thus adequately and specifically provide the user 12 with information.

The invention claimed is:

1. A method for operating a mobile radio apparatus connectable to at least one radio network via radio technology, the mobile radio apparatus having at least one display and at least one computing device for executing at least one computer program for presenting content provided in a computer network and retrievable via the radio network on the display, in which the mobile radio apparatus is connected to the radio network via radio technology, the method comprising opening the computer program with the computing device in response to determining whether at least one criterion characterizing a connection state of the mobile radio apparatus connected to the radio network is met, and displaying the content on the display by means of the opened computer program wherein the at least one criterion depends on a period of time over which the mobile radio apparatus is connected to the radio network via radio technology, and wherein if a value characterizing the period of time over which the mobile radio apparatus is connected to the radio network via radio technology reaches or exceeds a presettable threshold value the computing device automatically opens the computer program and presents the content on the display but if the value characterizing the period of time remains below the threshold value the content is not presented on the display.

2. The method according to claim 1, wherein the mobile radio apparatus is connected to at least one network apparatus of the radio network via radio technology, wherein the criterion depends on a signal strength of a signal communicated from the network apparatus to the mobile radio apparatus, and/or a position of the mobile radio apparatus relative to the network apparatus determined by means of the network apparatus.

3. The method according to claim 1, whereby a first-time input of data into the mobile radio apparatus by a user of the mobile radio apparatus is required in order to be able to connect the mobile radio apparatus to the radio network of an institution for the first time via radio technology, whereby the data required for the first-time connection is stored in a storage device of the mobile radio apparatus such that the first-time input of data is not only first-time but also one-time as long as deletion of the storage device or of the input data does not occur, that a re-connection occurring subsequent to a disconnection operation after the first-time connection of the mobile radio apparatus to the radio network can proceed automatically and without assistance of the user, and such that, if the user with the mobile radio apparatus visits institutions at different locations, the radio networks of which all have the same access or connection preconditions, connections of the mobile radio apparatus to the respective radio networks can be effected at the different locations automatically and without active assistance by the user.

4. The method of claim 3, wherein the data required for the first-time connection is a password, email address, or personal data for registration.

5. The method according to claim 1, wherein an Internet site of the Internet is displayed by means of the computer program as the content.

6. The method according to claim 1, wherein the mobile radio apparatus is connected to a wireless local area network as the radio network.

7. The method according to claim 1, further comprising determining a position of the mobile radio apparatus relative to the earth and/or relative to at least one network apparatus of the radio network by means of the radio network, and displaying further content depending on the determined position.

8. The method according to claim 1, further comprising communicating at least one message able to be displayed on the display by means of a computer program executable by the computing device to the mobile radio apparatus depending on the connection state.

9. The method according to claim 8, wherein the message is an e-mail.

10. The method according to claim 8, wherein the message is communicated depending on at least one piece of information specific to the mobile radio apparatus and transmitted upon connection to the radio network.

11. A mobile radio apparatus comprising a radio technology device for connecting the mobile radio apparatus to at least one radio network via radio technology, at least one display, and at least one computing device for executing at least one computer program, by means of which content provided in a computer network and retrievable via the radio network can be presented on the display of the mobile radio apparatus, wherein the computing device is configured to open the computer program depending on whether or not at least one criterion characterizing a connection state of the mobile radio apparatus being connected to the radio network is met, and to display content on the display by means of the opened computer program, wherein the criterion depends on a period of time over which the mobile radio apparatus is connected to the radio network via radio, and wherein the computing device is configured to automatically open the computer program and present the content on the display if a value characterizing the period of time over which the mobile radio apparatus is connected to the radio network via radio technology reaches or exceeds a presettable threshold value and to not automatically display the content if the value characterizing the period of time remains below the threshold value, such that the opening of the computer program as well as the presentation of the part of the content can be avoided if the mobile radio apparatus connects to the radio network without remaining connected to the radio network for the presettable period of time.

12. The method according to claim 11, wherein the content is a message communicated via the local radio network.

13. A method for automatically transmitting at least one message to a mobile radio apparatus connectable to a mobile communications network and to at least one local radio network different from the mobile communications network via radio technology, having at least one display and at least one computing device for executing at least one computer program for presenting a message communicated to the mobile radio apparatus on the display, the method comprising communicating a message being able to be displayed on the display by means of the computer program to the mobile radio apparatus connected to the local radio network depending on whether or not at least one criterion characterizing a connection state of the mobile radio apparatus connected to the local radio network is met, wherein the at least one criterion depends on a period of time over which the mobile radio apparatus is connected to the radio network via radio technology, and if a value characterizing the period of time over which the mobile radio apparatus is connected to the radio network via radio technology reaches or exceeds a presettable threshold value, the computer program is automatically opened by means of a control device and content is presented on the display, and if the value characterizing the period of time remains below the threshold value, the content is not automatically displayed, such that the opening of the computer program as well as presentation of the content can be avoided if a user with the mobile radio apparatus only moves past an institution within the radio network without staying in and/or at the institution for the threshold period of time.

14. A method for operating a mobile radio apparatus connectable to at least one radio network via radio technology, the mobile radio apparatus having at least one display and at least one computing device for executing at least one computer program for presenting content provided in a computer network and retrievable via the radio network on the display, in which the mobile radio apparatus is connected to the radio network via radio technology, the method comprising opening the computer program with the computing device in response to determining whether at least one criterion characterizing a connection state of the mobile radio apparatus connected to the radio network is met, and displaying content on the display by means of the opened computer program, whereby a first-time input of data into the mobile radio apparatus by a user of the mobile radio apparatus is required in order to be able to connect the mobile radio apparatus to the radio network of an institution for the first time via radio technology, wherein the at least one criterion depends on a period of time over which the mobile radio apparatus is connected to the radio network via radio technology, and wherein if a value characterizing the period of time over which the mobile radio apparatus is connected to the radio network via radio technology reaches or exceeds a presettable threshold value the computing device automatically opens the computer program and presents the content on the display but if the value characterizing the period of time remains below the threshold value the content is not presented on the display, and whereby the data required for the first-time connection, preferably a password, and/or email address and/or personal data for registration, is stored in a storage device of the mobile radio apparatus.

* * * * *